US011886902B2

(12) United States Patent
Tong et al.

(10) Patent No.: US 11,886,902 B2
(45) Date of Patent: Jan. 30, 2024

(54) PHYSICAL-TO-VIRTUAL MIGRATION METHOD AND APPARATUS, AND STORAGE MEDIUM

(71) Applicant: ZTE Corporation, Shenzhen (CN)

(72) Inventors: Yao Tong, Shenzhen (CN); Hua Li, Shenzhen (CN); Guang Shen, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 676 days.

(21) Appl. No.: 17/041,566

(22) PCT Filed: Apr. 2, 2019

(86) PCT No.: PCT/CN2019/080977
§ 371 (c)(1),
(2) Date: Sep. 25, 2020

(87) PCT Pub. No.: WO2019/196705
PCT Pub. Date: Oct. 17, 2019

(65) Prior Publication Data
US 2021/0019171 A1    Jan. 21, 2021

(30) Foreign Application Priority Data
Apr. 8, 2018   (CN) .......................... 201810308312.7

(51) Int. Cl.
G06F 9/455    (2018.01)
G06F 9/48     (2006.01)
G06F 11/10    (2006.01)

(52) U.S. Cl.
CPC ........ *G06F 9/45558* (2013.01); *G06F 9/4856* (2013.01); *G06F 11/1004* (2013.01);
(Continued)

(58) Field of Classification Search
None
See application file for complete search history.

(56) References Cited

U.S. PATENT DOCUMENTS 7,925,850 B1 *   4/2011   Waldspurger ......... G06F 9/4856
                                                   711/162
2008/0184225 A1   7/2008   Fitzgerald
(Continued)

FOREIGN PATENT DOCUMENTS

CN    101727392 A    6/2010
CN    102081552 A    6/2011
(Continued)

OTHER PUBLICATIONS

Russian Search Report for corresponding application 2020134438/07 filed Apr. 2, 2019; Report dated Nov. 7, 2022.
(Continued)

*Primary Examiner* — Wynuel S Aquino
(74) *Attorney, Agent, or Firm* — CANTOR COLBURN LLP

(57) ABSTRACT

Disclosed are a Physical to Virtual (P2V) migration method and apparatus, and a storage medium. The method includes that: disk data of a Physical Machine (PM) is transmitted to a server, wherein the disk data is used by the server to create and start a Virtual Machine (VM) based on the disk data of the PM; a first dirty data generated by running of a program on the PM in a transmission process of the disk data of the PM is acquired; the disk data for creating the VM is updated based on the acquired first dirty data; and based on the updated disk data for the VM, the VM is controlled to resume running the program based on a progress of the program.

15 Claims, 6 Drawing Sheets

(52) U.S. Cl.
CPC ............... *G06F 2009/4557* (2013.01); *G06F 2009/45562* (2013.01); *G06F 2009/45575* (2013.01); *G06F 2009/45591* (2013.01)

(56) References Cited

U.S. PATENT DOCUMENTS

| | | | |
|---|---|---|---|
| 2013/0212161 A1 | 8/2013 | Ben-Shaul | |
| 2016/0055026 A1 | 2/2016 | Fitzgerald | |
| 2016/0092261 A1* | 3/2016 | Li | G06F 9/45558 718/1 |
| 2016/0110215 A1 | 4/2016 | Bonilla | |
| 2017/0060616 A1 | 3/2017 | Onoue | |
| 2017/0272515 A1 | 9/2017 | Sanderson | |
| 2018/0136971 A1* | 5/2018 | Dong | G06F 9/45558 |
| 2018/0365046 A1* | 12/2018 | S S | G06F 1/3203 |

FOREIGN PATENT DOCUMENTS

| | | |
|---|---|---|
| CN | 102455942 A | 5/2012 |
| CN | 104503823 A | 4/2015 |
| CN | 104598303 A | 5/2015 |
| CN | 104965757 A | 10/2015 |
| CN | 106569881 A | 4/2017 |
| CN | 106897137 A | 6/2017 |
| CN | 107704314 A | 2/2018 |
| RU | 2446450 C2 | 3/2012 |
| WO | 2016205978 A1 | 12/2016 |

OTHER PUBLICATIONS

International Search Report for corresponding application PCT/CN2019/080977 filed Apr. 2, 2019; dated May 27, 2019.

European Search Report for corresponding application 19 784 957.3; Report dated Mar. 8, 2021.

Xue Jian, "The Convertion from Physical Machine to VMware Server", China Academic Journal Electronic Publishing House, 1994-2023.

* cited by examiner

PHYSICAL-TO-VIRTUAL MIGRATION METHOD AND APPARATUS, AND STORAGE MEDIUM

CROSS-REFERENCE TO RELATED APPLICATION

The present application is based upon and claims priority to Chinese Patent Application No. 201810308312.7, filed on Apr. 8, 2018, the entire contents of which are incorporated herein by reference.

TECHNICAL FIELD

The disclosure relates, but is not limited, to the technical field of communications, and in particular to a Physical to Virtual (P2V) Migration method and apparatus, and a storage medium.

BACKGROUND

With the rapid development of cloud computing and virtualization technologies, increasingly more enterprises use the cloud computing and virtualization technologies to construct new data centers to improve the resource utilization rate and the management efficiency. The core of the cloud computing technologies is a server virtualization technology. With virtualization on servers, a plurality of Virtual Machines (VMs) may run on one server. However, during construction of the new data centers, how to migrate a system on an existing Physical Machine (PM) to a cloud platform to run as a VM is a crucial problem. In the relevant art, in order to implement P2V migration, it is necessary to repeatedly interrupt a program run by the PM, such that the execution of the program is greatly affected, and the user experience is poor.

SUMMARY

In view of this, embodiments of the disclosure provide a P2V migration method and apparatus, and a storage medium, which can reduce the impact on a program while implementing P2V migration.

The embodiments of the disclosure provide a P2V migration method, which may include the following operations.

Disk data of a PM is transmitted to a server, wherein the disk data is used by the server to create and start a VM based on the disk data of the PM.

A first dirty data generated by running of a program on the PM in a transmission process of the disk data of the PM is acquired.

The disk data for creating the VM is updated based on the acquired first dirty data.

Based on the updated disk data for the VM, the VM is controlled to resume running the program based on a progress of the program.

In the above solutions, the operation that the first dirty data generated by running of the program on the PM in the transmission process of the disk data of the PM is acquired may include the following operations.

A file corresponding to the program running on the PM is monitored in the transmission process of the disk data of the PM to form a record file.

The first dirty data generated by running of the program on the PM is acquired based on the record file.

In the above solutions, the operation that the first dirty data generated by running of the program on the PM is acquired based on the record file may include the following operations.

The record file is transmitted to the VM to obtain a check code generated and returned by the VM based on the record file.

A check code of a local file corresponding to the program is calculated.

The check code returned by the VM is matched with the calculated check code to obtain the first dirty data.

In the above solutions, the operation that the check code returned by the VM is matched with the calculated check code to obtain the first dirty data may include the following operations.

The calculated check code is sequentially read according to a file offset.

The check code read each time is respectively matched with the check code returned by the VM.

Data failed in matching is determined as the first dirty data generated by running of the program on the PM.

In the above solutions, the check code includes a strong check code and a weak check code.

Correspondingly, the operation that the check code read each time is respectively matched with the check code returned by the VM may include the following operations.

First matching is performed on a read first weak check code and a second weak check code returned by the VM.

When the first matching fails, it is determined that the matching fails.

When the first matching succeeds, second matching is performed on a first strong check code corresponding to the first weak check code and a second strong check code corresponding to the second weak check code.

When the second matching fails, it is determined that the matching fails.

In the above solutions, the operation that the VM generates the check code based on the record file may include the following operations.

Data in the record file is read.

The read data is segmented into data blocks according to a fixed byte length.

The corresponding check code is generated for each data block segment.

In the above solutions, the operation that the disk data for creating the VM is updated based on the acquired first dirty data may include the following operations.

The first dirty data is transmitted to the VM to enable the VM to perform first data update based on the first dirty data.

A second dirty data generated by running of the program on the PM in a process of the first data update is acquired.

The second dirty data is transmitted to the VM to enable the VM to perform second data update based on the second dirty data.

The above process is repeated till an Nth dirty data is acquired, the running of the program stops, and the Nth dirty data is transmitted to the VM, such that the VM performs Nth dirty data update based on the Nth dirty data.

A data size of the Nth dirty data is smaller than a preset data threshold.

In the above solutions, after the Nth dirty data is acquired, the method may further include the following operation.

A request for stopping the running of the program is transmitted to the VM, to acquire a response returned by the VM in response to the request.

In the above solutions, the operation that the VM performs the first data update based on the first dirty data may include the following operations.

A first temporary file is created.

The first dirty data and a first data stored in the VM are written into the first temporary file to form a second temporary file.

The first data is data except for a file offset corresponding to the first dirty data in a file corresponding to the program.

The file corresponding to the program and stored in the VM is replaced with the second temporary file.

In the above solutions, after the second temporary file is formed, the method may further include the following operations.

An overall check code of the second temporary file is calculated.

It is determined that the overall check code of the second temporary file is matched with an overall check code of the file corresponding to the program.

In the above solutions, the method may further include the following operations.

A type and version information for an operation system of the PM are compared with specified type and version information for an operation system of the VM.

A drive corresponding to the operation system of the VM is updated in a case where it is determined that the type of the operation system of the PM is the same as the specified type of the operation system of the VM and the version of the operation system of the PM is different from the specified version of the VM.

In the above solutions, the method may further include the following operations.

A difference between a version of a drive corresponding to the operation system of the PM and a specified version of the drive corresponding to the operation system of the VM is compared.

It is determined that the difference meets a preset drive update condition.

In the above solutions, the operation that the drive corresponding to the operation system of the VM is updated may include the following operations.

A difference file between the drive corresponding to the operation system of the PM and the specified drive corresponding to the operation system of the VM is acquired.

The difference file is synchronized to the VM, to update the drive corresponding to the operation system of the VM based on the difference file.

The embodiments of the disclosure further provide a P2V migration apparatus, which may include: a processing module, an acquisition module, an update module and a control module.

The processing module is configured to transmit disk data of a PM to a server, wherein the disk data is used by the server to create and start a VM based on the disk data of the PM.

The acquisition module is configured to acquire a first dirty data generated by running of a program on the PM in a transmission process of the disk data of the PM.

The update module is configured to update, based on the acquired first dirty data, the disk data for creating the VM.

The control module is configured to control, based on the updated disk data for the VM, the VM to take over the program run by the PM.

In the above solutions, the acquisition module is further configured to monitor a file corresponding to the program running on the PM in the transmission process of the disk data of the PM to form a record file; and acquire, based on the record file, the first dirty data generated by running of the program on the PM.

In the above solutions, the update module is further configured to transmit the first dirty data to the VM to enable the VM to perform first data update based on the first dirty data;

acquire a second dirty data generated by running of the program on the PM in a process of the first data update;

transmit the second dirty data to the VM to enable the VM to perform second data update based on the second dirty data; and repeat the above process till an Nth dirty data is acquired, stop to run the program, and transmit the Nth dirty data to the VM, such that the VM performs Nth dirty data update based on the Nth dirty data.

A data size of the Nth dirty data is smaller than a preset data threshold.

In the above solutions, the apparatus may further include: a filter module.

The filter module is configured to compare a type and version information for an operation system of the PM with specified type and version information for an operation system of the VM; and update a drive corresponding to the operation system of the VM in a case where it is determined that the type of the operation system of the PM is the same as the specified type of the operation system of the VM and the version of the operation system of the PM is different from the specified version of the VM.

The embodiments of the disclosure further provide a P2V migration apparatus, which may include: a memory and a processor.

The memory is configured to store an executable program.

The processor is configured to run the executable program stored in the memory to implement the above-mentioned P2V migration method.

The embodiments of the disclosure further provide a storage medium, which stores an executable program; and the executable program is executed by a processor to implement the above-mentioned P2V migration method.

By applying the P2V migration method and apparatus, and the storage medium provided by the embodiments of the disclosure, the disk data for creating the VM is updated, such that data synchronization between the PM and the VM is implemented; and in the entire P2V migration process, only when the VM takes over the program run by the PM, the program run by the PM is interrupted, and thus the impact on the program is little and the user experience is high.

DETAILED DESCRIPTION OF THE EMBODIMENTS

Figure 1:
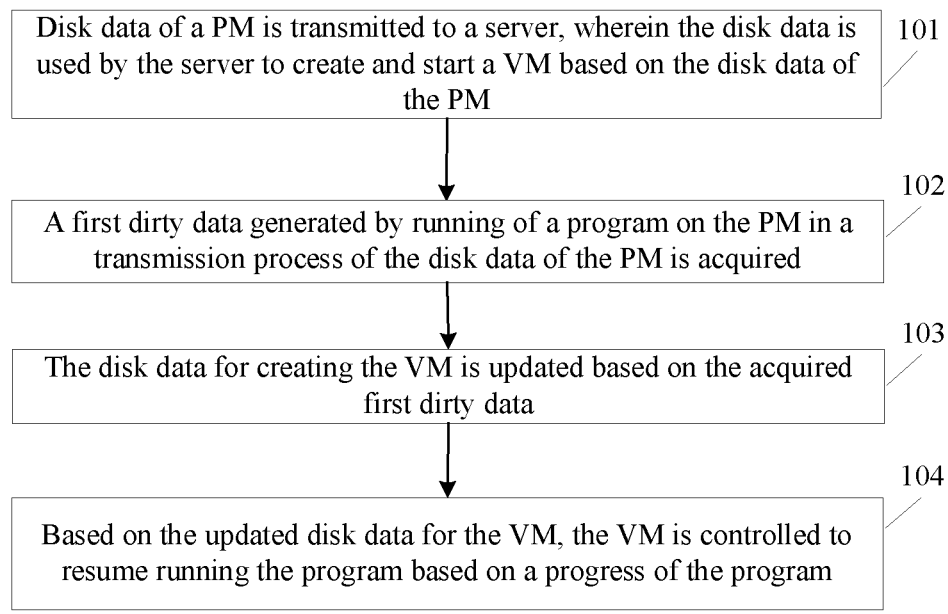
FIG. 1 is a flowchart schematic diagram of a P2V migration method provided by an embodiment of the disclosure.

The disclosure is further described below in detail in combination with accompanying drawings and embodiments. It should be understood that the embodiments described herein are intended to explain the disclosure but not to limit the disclosure. In addition, the embodiments provided hereinafter are a part of embodiments for implementing the disclosure, rather than all embodiments for implementing the disclosure. The technical solutions described in the embodiments of the disclosure may be implemented in any combined manner if there is no conflict.

It is to be noted that the term "first/second/third" related in the embodiments of the disclosure is merely for distinguishing similar objects rather than indicating a special order of the related objects. It may be understood that for the terms "first/second/third", a special sequence or chronological sequence may be exchanged in an allowable condition. It should be understood that the objects distinguished by the "first/second/third" may be interchangeable in certain cases, such that the embodiments of the disclosure described here can be implemented in an order other than those illustrated or described here.

In the embodiments of the disclosure, the terms "comprises," "comprising," "includes," "including," "has," "having" or any other variation thereof, are intended to cover a non-exclusive inclusion, such that the method or apparatus including a series of elements not only includes the explicitly described elements, but also may include other implicitly listed elements, or include inherent elements for implementing the method or apparatus. When not specifically limited, the elements defined by the statement "including a . . . " do not exclude that another relevant element (such as the operation in the method or the module in the apparatus, in which the module may be a part of a circuit, a part of a processor, a part of a program or software, etc.) further exists in the method or apparatus including the element.

For example, the P2V migration method provided by the embodiments of the disclosure includes a series of operations, but is not limited to the described operations. Likewise, the P2V migration apparatus provided by the embodiments of the disclosure includes a series of modules, but is not limited to the explicitly described modules, and may further include a unit that is used to acquire relevant information or process based on the information.

It is found by the inventor in research that the P2V migration may be implemented in the following manner in an embodiment: an image for a disk of a source terminal is first created; then, the created image is put onto a disk of a destination terminal; a VM is started at the destination terminal; and thereafter, incremental data synchronization is performed for multiple times. The program has to be interrupted in each round of incremental data synchronization, so as to ensure that the data on a destination host is consistent with the data on a source host. It is apparent that because the program is interrupted for multiple times, the execution of the program is greatly affected, and the user experience is poor.

For the purpose of reducing the impact on the running program during P2V migration, in an embodiment, the P2V migration may be implemented in the following manner: the disk data of a PM is transmitted to a virtualization management platform to create and start a VM based on the disk data of the PM; a first dirty data generated by running of a program on the PM in a transmission process of the disk data of the PM is acquired; the disk data for creating the VM is iteratively updated based on the acquired first dirty data; and based on the updated disk data for the VM, the VM is controlled to take over the program run by the PM.

First of all, the description is made to the nouns and terms in the embodiments of the disclosure. The nouns and terms in the embodiments of the disclosure have the following explanations.

1) Dirty data: as it is possible that there is still a program running on the source terminal when the file is copied to the destination terminal, the changed data in the file is referred to as the dirty data. If there is still new data written into the file, the newly written data is referred to as the dirty data.

2) Dirty data rate: the dirty data rate indicates a probability that data is written within a period of time, and is a predicted value estimated according to data written in a previous period of time. The dirty data rate is positively correlated with a rate for writing the new data.

Figure 2:
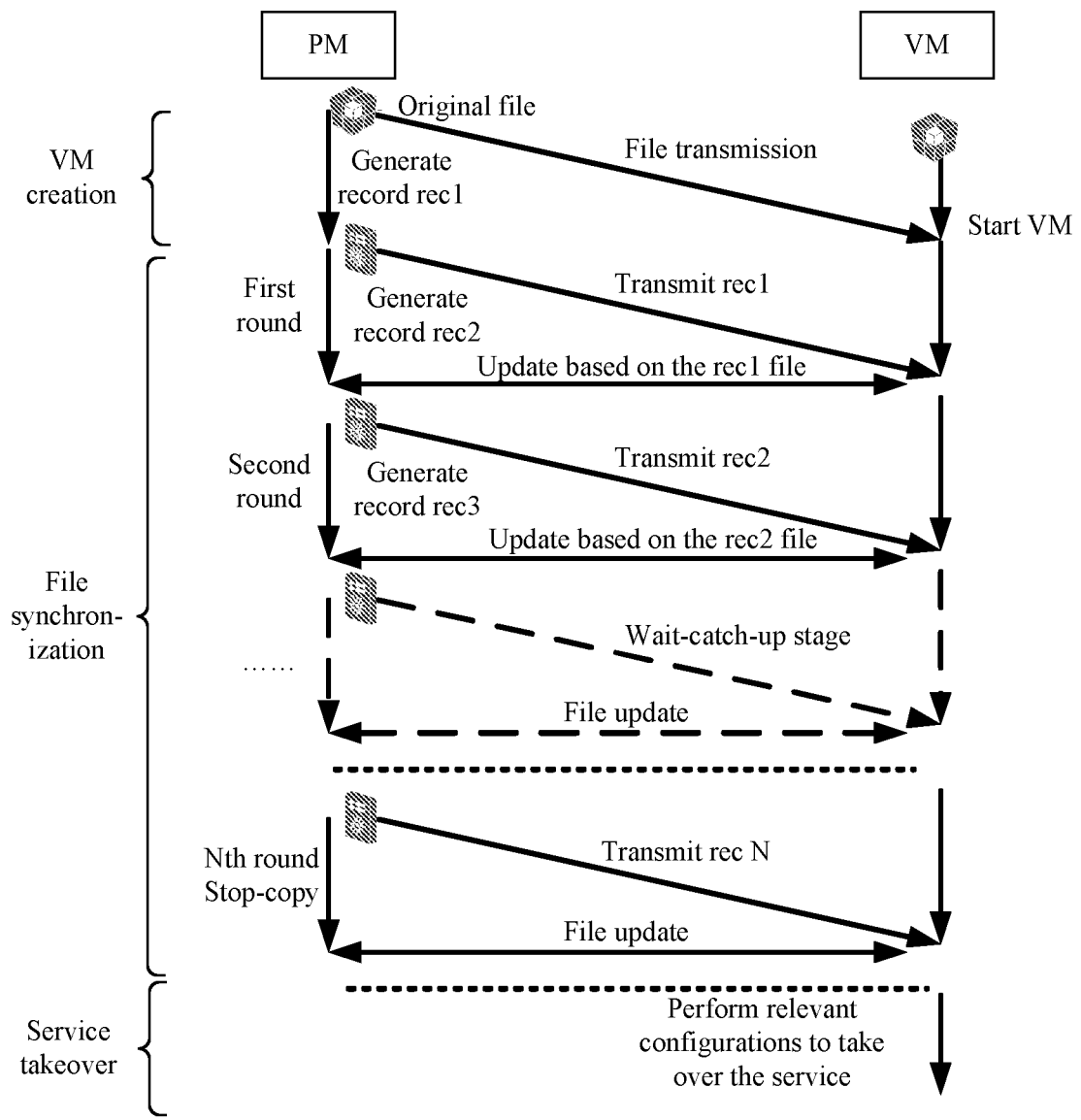
FIG. 2 is a flowchart schematic diagram of a P2V migration method provided by an embodiment of the disclosure.

FIG. 1 is a flowchart schematic diagram of a P2V migration method provided by an embodiment of the disclosure. FIG. 2 is a flowchart schematic diagram of another P2V migration method provided by an embodiment of the disclosure. Based on the above explanations for the nouns and terms in the embodiments of the disclosure, the technical solution of an embodiment of the present disclosure is described below with reference to FIG. 1 and FIG. 2. The P2V migration provided in the embodiment of the disclosure is online migration (live migration), and is implemented by a P2V migration apparatus. Referring to FIG. 1 and FIG. 2, the P2V migration method provided by the embodiment of the disclosure may include the following operations.

In operation 101, disk data of a PM is transmitted to a virtualization management platform to create and start a VM based on the disk data of the PM.

Herein, in practical applications, the virtualization management platform is implemented by a Virtualization Application System (VAS). The VAS is implemented based on a Kernel-based Virtual Machine (KVM). The virtualization management platform is implemented by deploying virtualization applications on the server and provides a completely Browser/Server (B/S) architecture-based management console, and therefore can conveniently manage the VMs. The PM may be a physical Linux host.

In an embodiment, before the disk data of the PM is transmitted to the virtualization management platform, the PM may perform a system initialization operation, and create system global variables (such as disk information, and a record file descriptor). In an embodiment, a log record module may further be started to record logs (such as a result of each operation, a data transmission condition and an execution result of a key command in the migration process), thereby facilitating system maintenance and error lookup. In an embodiment, a system exception (such as a network interrupt, a configuration error, an installation error of a boot program, and a VAS system exception) may also be detected to obtain a detection result.

In an embodiment, the PM may transmit the disk data of the PM to the virtualization management platform in the following manner: the disk data of the PM (i.e., all effective files and original files on the disk) is acquired in response to a received live migration instruction; and the disk data of the PM is transmitted to the virtualization management platform via communication connection with the virtualization management platform, such that the virtualization management platform creates and starts the VM based on the disk data of the PM.

In operation 102, a first dirty data generated by running of a program on the PM in a transmission process of the disk data of the PM is acquired.

In practical applications, it is possible that a program is running on the PM while the PM transmits the disk data. As a result, in the process when the disk data is transmitted and the VM is created and started, the files under directories the data of which has been copied may be changed, for example, addition, deletion, modification, attribute change and move may happen in the files, and thus the dirty data, i.e., the changed data, is generated on the PM.

In an embodiment, the PM may acquire, in the following manner, the first dirty data generated by running of the program on the PM in the transmission process of the disk data of the PM.

A file corresponding to the program running on the PM is monitored in the transmission process of the disk data of the PM to form a record file (rec1); and the first dirty data generated by running of the program on the PM (i.e., the changed data) is acquired based on the record file. In practical application, the update of a file under a directory may be monitored, and the update of all files under the directory and files under subdirectories is detected. In addition to recording a modified file, a specified event may also be monitored, and a file to be monitored can be screened. In an embodiment, the record file is formed periodically, i.e., the monitoring on the file is performed periodically. The period is set by taking the implementation of one data synchronization (copy) as one period. When the next file synchronization is performed, the file is monitored again.

In an embodiment, the operation that the first dirty data generated by running of the program on the PM is acquired based on the record file may include that: the record file is transmitted to the VM to obtain a check code generated and returned by the VM based on the record file; a check code of a local file corresponding to the program is calculated; and the check code returned by the VM is matched with the calculated check code to obtain the first dirty data.

In an embodiment, the operation that the check code returned by the VM is matched with the calculated check code to obtain the first dirty data may include that: the calculated check code is sequentially read according to a file offset; the check code read each time is respectively matched with the check code returned by the VM; and data failed in matching is determined as the first dirty data generated by running of the program on the PM.

In an embodiment, the check code includes a strong check code and a weak check code.

Correspondingly, the operation that the check code read each time is respectively matched with the check code returned by the VM may include that: first matching is performed on a read first weak check code and a second weak check code returned by the VM; when the first matching fails, it is determined that the matching fails; when the first matching succeeds, second matching is performed on a first strong check code corresponding to the first weak check code and a second strong check code corresponding to the second weak check code; when the second matching fails, it is determined that the matching fails; and when the first matching succeeds and the second matching succeeds, it is determined that the matching succeeds.

In an embodiment, the operation that the VM generates the check code based on the record file may include that: data in the record file is read; the read data is segmented into data blocks according to a fixed byte length; and the corresponding check code is generated for each data block segment.

Exemplarily, upon the reception of the record file (rec1) transmitted by the PM, the VM reads a file to be synchronized, and puts the file into a file list. Then, the VM sequentially reads each file, segments the file into data blocks of the same length according to a fixed byte length, respectively calculates two check codes for each data block, and stores the check codes to corresponding data structures. At last, the VM transmits the check codes to the PM terminal. The PM calls a system function to open a Transmission Control Protocol (TCP) channel between the PM and the VM, reads data from the channel, stores the received check codes to a hash table, and performs check code matching. The PM circularly reads the file to be synchronized, circularly calculates the weak check code of the data block for each time, and then finds whether a matched weak check code exists in the hash table. If the matched weak check code is found, the PM calls a function to calculate a strong check code and makes a comparison based on the calculated strong check code. If the matched weak check code is not found, the PM adds the file offset by 1 and continues to read the next data block. In case of matching for both the weak check code and the strong check code, the PM compares an interval between a current matching offset and a previous matching offset, and transmits the data within this interval, which is namely unmatched data (the first dirty data). The PM then adds the file offset by the size of the data block, and continues reading the next data block.

In operation 103, the disk data for creating the VM is updated based on the acquired first dirty data.

In an embodiment, the following manner may be used by the PM to update, based on the acquired first dirty data, the disk data for creating the VM.

The first dirty data is transmitted to the VM to enable the VM to perform first data update based on the first dirty data. A second dirty data generated by running of the program on the PM in a process of the first data update is acquired. The second dirty data is transmitted to the VM to enable the VM to perform second data update based on the second dirty data. The above process is repeated till an Nth dirty data is acquired, the running of the program stops, and the Nth dirty data is transmitted to the VM, such that the VM performs Nth dirty data update based on the Nth dirty data. In the embodiment, a data size of the Nth dirty data is smaller than a preset data threshold, or a dirty data rate after the Nth dirty data is acquired is smaller than a preset threshold.

Herein, the manners for acquiring the second dirty data, the third dirty data . . . the Nth dirty data are the same as the manner for acquiring the first dirty data, and the Nth dirty data is obtained based on the record file recN.

Exemplarily, referring to FIG. 2, in the first round of data transmission, the program runs on the PM simultaneously, and the changes of all files in the transmission process are recorded in the file rec1. Thereafter, the rec1 is transmitted to the target VM to update the file. During the file update, the VM generates a second record file rec2. In the following iterative process, the record file generated in the previous round of file update is always copied. Because the speed for record transmission and file update is fast, the size of the record file on the PM is reduced to a very small order of magnitude quickly. After several rounds of data transmission, when the record file on the PM is reduced to a threshold V set by the system (note: the threshold may be set in advance, and how many records are updated in the record file, i.e., the degree of change of the file, serves as the measurable indicator), the Nth dirty data is obtained based on the current record file.

In an embodiment, the operation that the VM performs the first data update based on the first dirty data may include the following operations.

A first temporary file is created; the first dirty data and a first data stored in the VM are written into the first temporary file to form a second temporary file, wherein the first data is data except for a file offset corresponding to the first dirty data in a file corresponding to the program; and the file corresponding to the program and stored in the VM is replaced with the second temporary file.

In an embodiment, after the second temporary file is formed, the method may further include the following operations.

An overall check code of the second temporary file is calculated; and it is determined that the overall check code of the second temporary file is matched with an overall check code of the file corresponding to the program.

The case where the data update is performed based on the first dirty data is used as the example for description. Upon the reception of the first dirty data transmitted by the PM, the VM creates a temporary file (a first temporary file), then reads the first dirty data. When the first dirty data has a matching record, the VM reads the dirty data from the local file and writes the dirty data into the temporary file. When the first dirty data has no matching record, the VM writes a content of the first dirty data to the temporary file according to an offset. In this way, the temporary file may be completely formed from beginning to end. After the temporary file is generated, the weak check code of the entire file is calculated, and compared with the overall check code of the original file that is received from the PM terminal. In a case where the weak check code is consistent with the overall check code, the local file is replaced with the temporary file. In a case where the weak check code is not consistent with the overall check code, the temporary file is deleted and the entire file is resynchronized.

In an embodiment, after the Nth dirty data is acquired, the method may further include the following operation.

A request for stopping the running of the program is transmitted to the VM, to acquire a response returned by the VM in response to the request.

Exemplarily, after the Nth dirty data is acquired, the PM inquires the destination VM whether a stop-copy stage may be executed immediately (i.e., the request for stopping the running of the program is transmitted). If the VM has not completely finished processing the previous round of file update, the VM transmits a message to the PM to delay the execution of the stop-copy stage, and the PM continues executing the iterative transmission of the data. Since the VM has a fast file update rate, the file state of the destination VM can generally catch up with the file state of the PM. If the stop-copy condition still cannot be met after multiple times of inquiry, the entry of the stop-copy stage is forcible, and this can possibly result in relatively long downtime. When the stop-copy stage starts, the PM stops running the program, and the VM performs the data update based on the Nth dirty data, such that the file states of the destination VM and the PM are consistent. In order to ensure the consistency of the data, all files are synchronized for the last time.

In operation 104, based on the updated disk data for the VM, the VM is controlled to resume running the program based on a progress of the program.

During practical implementations, the PM stores information about the running program to the file, transmits the file to the VM and interrupts the running program. The VM sequentially starts each program based on the received file, modifies an Internet Protocol (IP) address of the VM as a source PM address, starts a service progress for externally providing the service (program), and broadcasts the IP address of the VM. In this way, the VM can take over the program of the source PM.

In an embodiment, the method may further include that: a type and version information for an operation system of the PM are compared with specified type and version information for an operation system of the VM; and a drive corresponding to the operation system of the VM is updated in a case where it is determined that the type of the operation system of the PM is the same as the specified type of the operation system of the VM and the version of the operation system of the PM is different from the specified version of the VM. The method may further include the following operations.

A difference between a version of a drive corresponding to the operation system of the PM and a specified version of the drive corresponding to the operation system of the VM is compared; and it is determined that the different meets a preset drive update condition.

In an embodiment, the operation that the drive corresponding to the operation system of the VM is updated may include the following operations.

A difference file between the drive corresponding to the operation system of the PM and the specified drive corresponding to the operation system of the VM is acquired; and the difference file is synchronized to the VM, to update the drive corresponding to the operation system of the VM based on the difference file.

Exemplarily, the PM acquires the type and version information of its own operation system as well as the user-specified information of the operation system of the VM terminal. In a case where the type of the operation system of the PM is inconsistent with the user-specified type of the operation system of the VM terminal, an error prompt indicating that "migration fails due to different operation systems" is provided. In a case where the type of the operation system of the PM is consistent with the user-specified type of the operation system of the VM terminal, but the version of the operation system of the PM is inconsistent with the user-specified version of the operation system of the VM terminal, the difference between the versions of the drive programs of the two operation systems is checked. Whether the version of the drive program is upgraded is determined according to a condition preselected and specified by the use, an example for such condition is whether the interval of the release time of the drive program is within a half-year. If the version of the drive program needs to be upgraded, the corresponding service is stopped, the original drive version is uninstalled, a new drive version is installed, and the corresponding device is bound. If the version of the drive program does not need to be upgraded, the devices bound to the VM terminal are scanned circularly, a filter device is generated and bound for each device, and after all devices are bound with their respective filter devices, the corresponding service is restarted.

Figure 3:
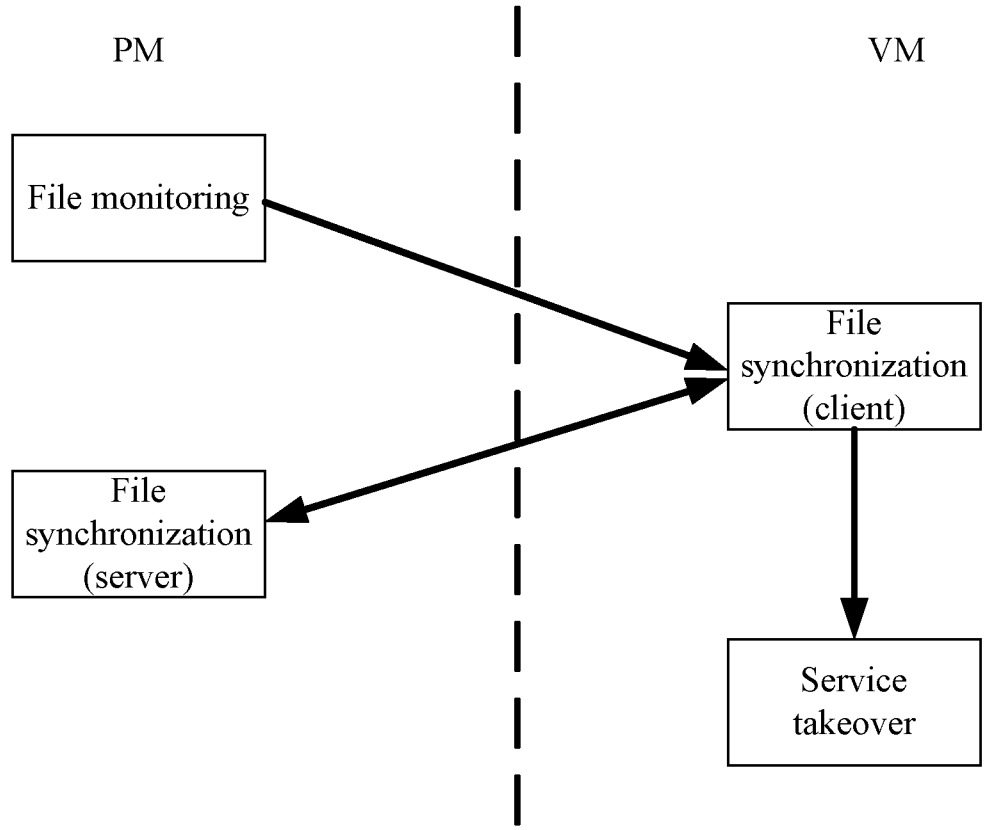
FIG. 3 is an implementation schematic diagram of P2V migration provided by an embodiment of the disclosure.

In an embodiment, the P2V migration may be mainly summarized into three parts, namely, file monitoring, file synchronization and program takeover. FIG. 3 is an implementation schematic diagram of P2V migration provided by an embodiment of the disclosure. Referring to FIG. 3, the process may include the following operations.

File monitoring: any file being changed during migration or synchronization is monitored, and relevant changes are recorded. Upon the end of one round of file synchronization, the record file is transmitted to the destination VM terminal for file synchronization.

File synchronization: this operation may be divided into the file synchronization at the source PM terminal and the file synchronization at the destination VM terminal, i.e., a Client/Server (C/S) structure. The destination VM terminal serves as the client, and the PM terminal serves as the server. The client receives the record file from the server, initiates a synchronization operation, and calculates and transmits the check code of the file to be synchronized. The server receives the file check code of the client, matches the calculated check code of the local file with the check code, calculates the difference file, and transmits the difference file to the client. Upon the reception of the difference file, the client restores the file. By performing the above series of processes, one round of synchronization process is completed.

Program takeover: upon the completion of the last file synchronization, relevant configurations and operations are performed on the destination VM, such that the VM takes over the program of the PM.

By applying the above embodiments of the disclosure, after the migration starts, the running of the program does not stop at the source terminal (PM). After applying for the resource required for running the VM at the destination terminal, the migration is implemented via cyclic and iterative copy. Specifically, the data of the source terminal is transmitted to the destination terminal, all data are transmitted in a first round of iteration, and all changed data in the first round of iteration are acquired by monitoring. In each next round of iteration, changed data (dirty data) in the previous round of iteration are transmitted. After multiple rounds of iteration, when the final dirty data rate is lower than a preset threshold, the iteration is terminated to enter a shutdown stage. After the last round of iteration, the VM on the destination terminal and the program thereon are started, and the program on the VM at the source terminal is terminated. By means of the above embodiments, the downtime of the program and the impact on the program can be shortened to the minimum.

In the relevant art, only the migration of the operation system of the same version is supported, that is to say, the operation system before the migration has to be the same as that after the migration, and the version of the operation system after the migration cannot be upgraded (for example, when some programs are in a Win8 operation system before the migration, and are required to be upgraded to a Win10 operation system after the migration because the operation system of the high version has more abundant Application Programming Interface (API) interfaces and less security holes, the upgrade of the version of the operation system during the migration cannot be achieved based on the solution in the relevant art). By applying the above embodiments, the migration from the operation system of the low version to the operation system of the high version is implemented. By virtue of a drive filter module, the difference in the impacts of the drives of different versions at the bottom layer on the programs at the upper layer is shielded, and the version of the drive program can be automatically upgraded, thereby improving the program development efficiency and experience in the virtualization environment.

Figure 4:
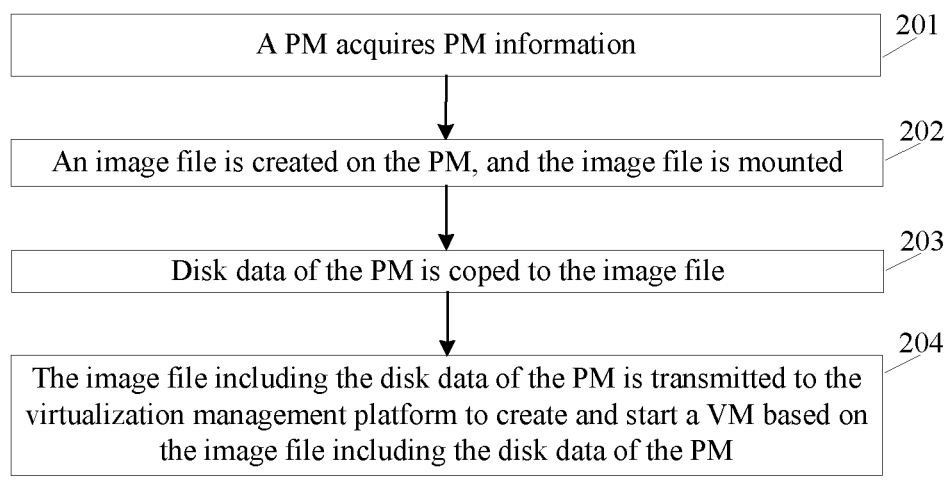
FIG. 4 is a flowchart schematic diagram of a P2V migration method provided by an embodiment of the disclosure.

FIG. 4 is a flowchart schematic diagram of a P2V migration method provided by an embodiment of the disclosure. The P2V migration provided by the present embodiment of the disclosure is cold migration, and is implemented by a P2V migration apparatus. During practical implementations, the cold migration may include local migration and remote migration. The local migration in the embodiment of the disclosure is described hereinafter based on FIG. 4, and may include the following operations.

In operation 201, a PM acquires PM information.

Herein, during practical implementations, in response to a cold migration instruction from the user, relevant information of the PM, such as a Central Processing Unit (CPU), a memory and a disk capacity, should be acquired first in order to create a VM same as the PM in the VAS. Certainly, corresponding modifications may also be made manually or made after the VM is created. The information may be acquired by executing a shell script and stored to a local file; then, the information is read to a program and stored by using a data structure; and corresponding commands are generated at the PM host terminal according to the information and directly executed in the VAS host.

In an embodiment, the P2V migration method may be completed by a P2V migration system. The P2V migration system may include an X86 server and a desktop computer. The VAS is installed on the X86 server, and the Linux operation system is installed on the desktop computer. The program runs at the PM host terminal, and the shell script is executed at the VAS host terminal and is controlled by the PM host terminal.

In operation 202, an image file is created on the PM, and the image file is mounted.

Herein, to generate the disk image file in the local disk, the disk having a appropriate size needs to be selected to serve as a working domain, namely, the storage path of the disk image file. In an embodiment, before the image file is created, the working domain of the image file needs to be selected, which may be specifically implemented in the following manner.

Corresponding commands are executed by scripts, sizes of free spaces of partitions of all disks are traversed, all physical disk devices and mounted directories that meeting the size of the target virtual disk space are found and the result is stored to the file. Then, all available devices are displayed, and one disk is selected to create the working domain. In a case where no disk in the current system can meet the virtual disk size, an error is reported for withdrawal.

In practical applications, after the working domain of the image file is selected, the image file (one or more image files) is created in the working domain, and one image file represents one disk. Since the image file is to be partitioned, the created file can include a complete file system and thus a loop device is to be used. In the Linux system, the loop device is a pseudo-device, or a simulation device, and can enable a user to access the file like a block device. Before use, the loop device should be connected to one file. If this file includes a complete file system, the file can be mounted like a disk device.

In operation 203, disk data of the PM is copied to the image file.

In an embodiment, after the image file is created and mounted, it is necessary to partition and format the disk and create a Logical Volume Manager (LVM) partition for the mounted file. Thereafter, the disk is mounted, and data under a root directory in the local disk are copied to the disk file. The file copy is performed by taking the subdirectory under the root directory as a unit.

In an embodiment, the method may further include: a boot program is refreshed. Specifically, during practical implementations, the operation may be implemented in the following manner.

a: SeaBIOS device information is loaded and self test is performed (note: the KVM VM uses SeaBIOS software to simulate the BIOS to implement similar functions), and a first bootable apparatus can be obtained according to configuration information.

b: a bootLoader (generally, a grub program) of a Master Boot Record (MBR) in the first bootable apparatus is read and run, and relevant work, such as modification of a scsi drive program, is initialized.

c: a Kernel is loaded according to a configuration of the boot loader, the Kernel starts to detect hardware and load the drive program, obtains a device name of a system boot disk, and sets a boot partition.

d: after the hardware is driven successfully, the Kernel actively calls an init program to initialize the system and then boots various services.

In operation 204, the image file including the disk data of the PM is transmitted to the virtualization management platform to create and start a VM based on the image file including the disk data of the PM.

Herein, during practical implementations, the image file may be manually copied to relevant directories of the VAS host, the VM may be created on the management page, the image file may be selected as the storage of the VM, the image file in the system disk may be selected for booting, and the VM may be booted for relevant configurations.

Figure 5:
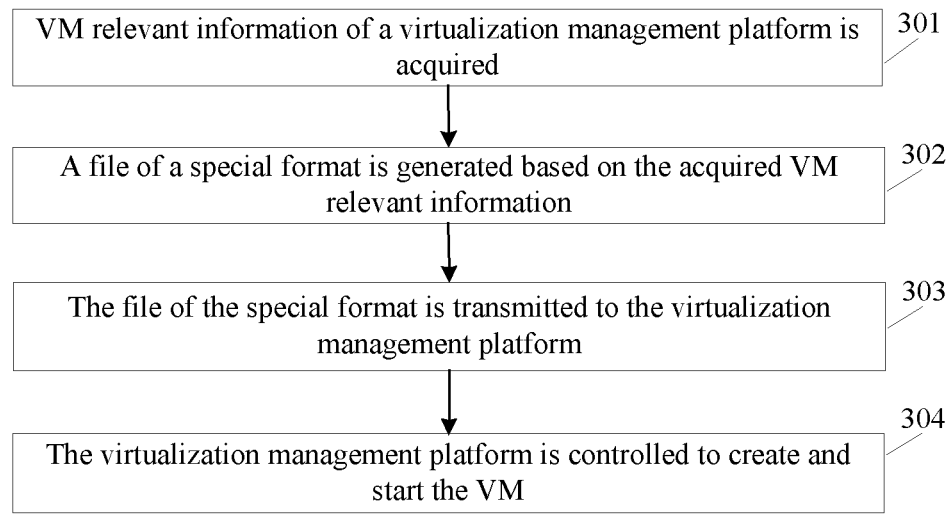
FIG. 5 is a flowchart schematic diagram of a P2V migration method provided by an embodiment of the disclosure.
Figure 6:
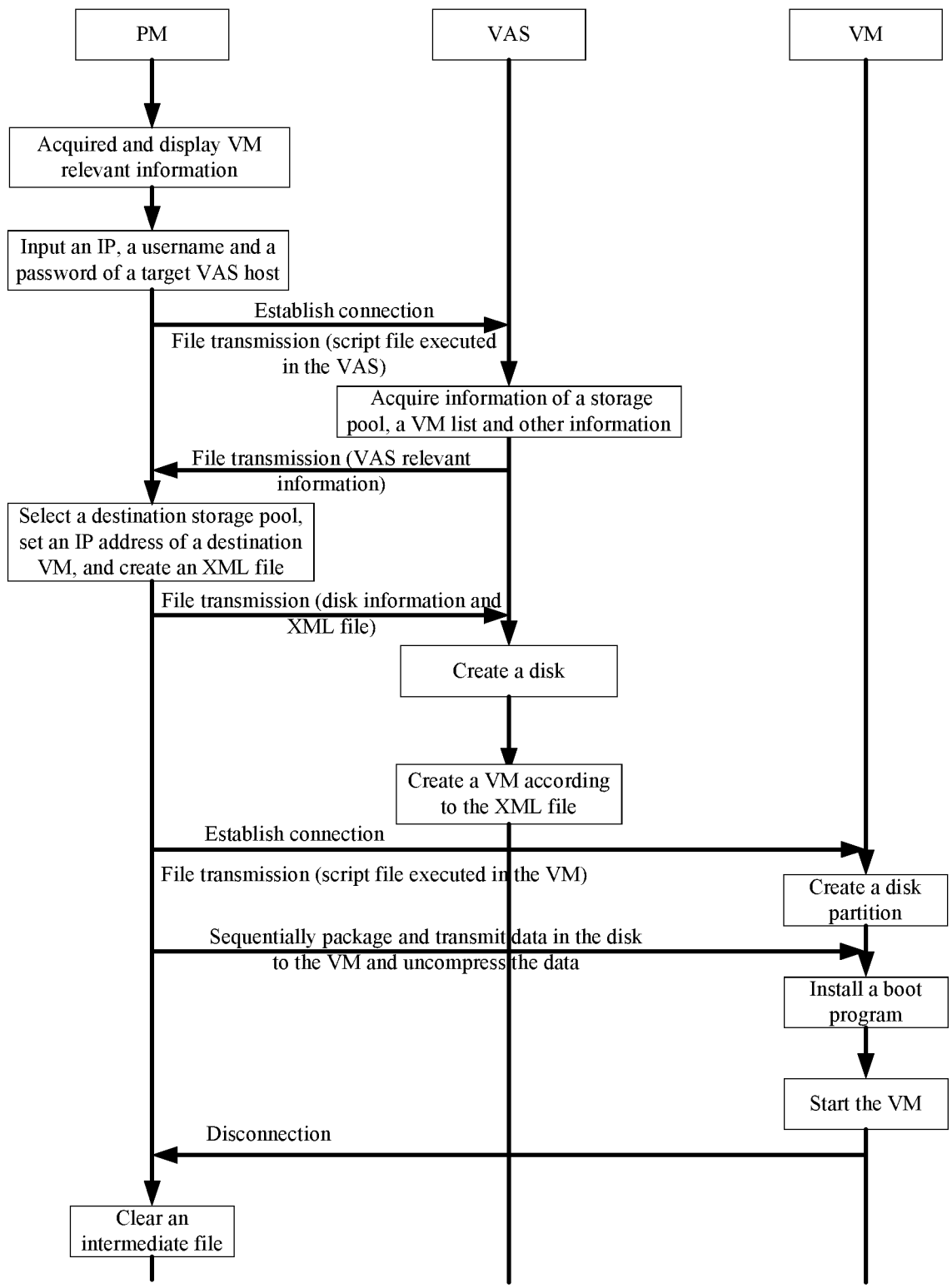
FIG. 6 is a flowchart schematic diagram of a P2V migration method provided by an embodiment of the disclosure.

FIG. 5 is a flowchart schematic diagram of a P2V migration method provided by an embodiment of the disclosure. FIG. 6 is a flowchart schematic diagram of another P2V migration method provided by an embodiment of the disclosure. The P2V migration provided by the present embodiment of the disclosure is cold migration, and is implemented by a P2V migration apparatus. During practical implementations, the cold migration may include local migration and remote migration. The remote migration in the embodiment of the disclosure is described hereinafter in combination with FIG. 5 and FIG. 6, and may include the following operations.

In operation 301, VM relevant information of a virtualization management platform is acquired.

Herein, in practical implementations, compared with the local migration, since the remote migration involves in the transmission of the file among different hosts, the process is relatively complicated. In order to ensure the consistency of the data, all external services on the PM are stopped during migration (the external network is closed).

In an embodiment, the P2V migration method may be completed by a P2V migration system. The P2V migration system may include an X86 server and a desktop computer. The VAS is installed on the X86 server, and the Linux operation system is installed on the desktop computer. The program runs at the PM host terminal, and the shell script is executed at the VAS host terminal and is controlled by the PM host terminal.

In practical implementations, in response to a cold migration instruction of the user, before the VM relevant information of the virtualization management platform is acquired, the PM relevant information (CPU, memory and the like) may be acquired and displayed.

In an embodiment, the VM relevant information of the virtualization management platform may be acquired in the following manner: communication connection with the virtualization management platform (VAS) is established, and a script file is transmitted to the virtualization management platform; and the virtualization management platform is controlled to run the script file, so as to return the VM relevant information to the virtualization management platform.

In practical implementations, the communication connection with the VAS is established according to input IP address, username, password and other information of the VAS host.

In an embodiment, the VM relevant information may include information such as a storage pool and a VM list.

In operation 302, a file of a special format is generated based on the acquired VM relevant information.

In an embodiment, after the PM acquires the VM relevant information returned by the VAS, the user specifies names of the storage pool and the VM from a set of options, sets a temporary IP address for the VM and generates, according to the special format, an Extensive Markup Language (XML) file (the file of the special format) required to create the VM. If the space capacity of the selected storage pool is smaller than that of the disk of the source PM, a prompt is given to the user to select an appropriate storage pool, and the finally generated image file is stored in the storage pool.

In an embodiment, the process may further include that: the PM terminal controls the VAS terminal to execute the script to acquire the number of CPU cores, total memory size, existing VM name list and other information of the VAS host and then writes the information into files. Then, the PM terminal acquires these files, and the user selects to modify or not to modify the information (the CPU, memory, VM name and the like) according to the prompt. However, in cases where the number of the CPU cores of the PM is greater than that of the VAS host, the memory of the PM is greater than that of the VAS host, or the name of the PM host already exists in the VAS, the information should be modified.

In an embodiment, the process may further include that: relevant information in the migration process, such as an IP address, a subnet mask and a gateway, is configured, and the input information is stored in the variable. Herein, the network configurations are merely used in the migration process. The IP address of the auxiliary VM and the final IP address of the destination VM are configured by the user or set as the network address of the source PM.

In operation 303, the file of the special format is transmitted to the virtualization management platform.

In operation 304, the virtualization management platform is controlled to create and start the VM.

In an embodiment, the virtualization management platform may be controlled in the following manner to create and start the VM: the virtualization management platform is controlled to create an auxiliary VM based on the VM relevant information; communication connection with the auxiliary VM is established; and the disk data of the PM is transmitted to the auxiliary VM via the communication connection of the auxiliary VM, such that the auxiliary VM creates and starts the VM based on the disk data of the PM.

Exemplarily, the P2V migration apparatus remotely controls the virtualization management platform (VAS) to create the auxiliary VM based on the VM relevant information, starts the auxiliary VM from one International Standards Organization (ISO) file in which a micro linux system is run, establishes a connection with the PM through the Linux system, and then partitions and formats the disk, and creates the LVM partition according to obtained disk partition information of the PM. After the auxiliary VM is logged in through the established communication connection with the auxiliary VM, a key file is transmitted first, and then a script file to be executed, partition information and the like are transmitted to specified directories of the VM.

In an embodiment, before the disk data of the PM is transmitted to the auxiliary VM, the process may further include that: the disk is partitioned by the auxiliary VM, a PM file is backed up, and a boot program is installed, corresponding operations including partition creation, data backup and refresh of boot program.

1) Partition creation: before the disk is partitioned, the disk needs to be mounted to the operation system; and during remote migration, the disk is directly mounted in the auxiliary VM, and then a P2V tool partitions the disk sequentially according to disk partition information.

2) Data backup: upon the completion of the partition of the disk, the disk is mounted, and then the data under the root directory of the disk is copied to the disk file. The file copy is performed by taking the subdirectory under the root directory as a unit.

3) Refresh of boot program includes the following operations.

a: SeaBIOS device information is loaded and self test is performed (note: the KVM VM uses SeaBIOS software to simulate the BIOS to implement similar functions), and a first bootable apparatus can be obtained according to configuration information.

b: a bootLoader (generally, a grub program) of a Master Boot Record (MBR) in the first bootable apparatus is read and run, and relevant work, such as modification of a scsi drive program, is initialized.

c: a Kernel is loaded according to a configuration of the boot loader, the Kernel starts to detect hardware and load the drive program, obtains a device name of a system boot disk, and sets a boot partition.

d: after the hardware is driven successfully, the Kernel actively calls an init program to initialize the system and then boots various services.

During practical applications, the data in the disk are sequentially packaged and transmitted to the auxiliary VM, which then decompresses the data. Subsequently, the auxiliary VM installs the boot program and starts the VM (i.e., the auxiliary VM is booted from the disk of the VM) via reconfiguration.

Figure 7:
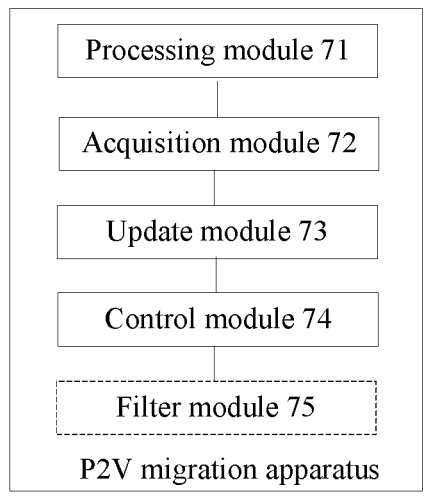
FIG. 7 is a compositional and structural schematic diagram of a P2V migration apparatus provided by an embodiment of the disclosure.

FIG. 7 is a compositional and structural schematic diagram of a P2V migration apparatus provided by an embodiment of the disclosure. As shown in FIG. 7, the P2V migration apparatus provided by the embodiment of the disclosure may include: a processing module 71, an acquisition module 72, an update module 73 and a control module 74.

The processing module 71 is configured to transmit disk data of a PM to a server, wherein the disk data is used by the server to create and start a VM based on the disk data of the PM.

The acquisition module 72 is configured to acquire a first dirty data generated by running of a program on the PM in a transmission process of the disk data of the PM.

The update module 73 is configured to update, based on the acquired first dirty data, the disk data for creating the VM.

The control module 74 is configured to control, based on the updated disk data for the VM, the VM to resume running the program based on a progress of the program.

In an embodiment, the acquisition module 72 is further configured to monitor a file corresponding to the program running on the PM in the transmission process of the disk data of the PM to form a record file; and acquire, based on the record file, the first dirty data generated by running of the program on the PM.

In an embodiment, the acquisition module 72 is further configured to transmit the record file to the VM to obtain a check code generated and returned by the VM based on the record file;

calculate a check code of a local file corresponding to the program; and match the check code returned by the VM with the calculated check code to obtain the first dirty data.

In an embodiment, the acquisition module 72 is further configured to sequentially read the calculated check code according to a file offset;

respectively match the check code read each time with the check code returned by the VM; and determine data failed in matching as the first dirty data generated by running of the program on the PM.

In an embodiment, the check code includes a strong check code and a weak check code.

In an embodiment, the acquisition module 72 is further configured to perform first matching on a read first weak check code and a second weak check code returned by the VM; and determine, when the first matching fails, that the matching fails;

perform, when the first matching succeeds, second matching on a first strong check code corresponding to the first weak check code and a second strong check code corresponding to the second weak check code; and determine, when the second matching fails, that the matching fails.

In an embodiment, the control module 74 is further configured to control the VM to read data in the record file;

segment the read data into data blocks according to a fixed byte length; and generate the corresponding check code for each data block segment.

In the above solutions, the update module 73 is further configured to transmit the first dirty data to the VM to enable the VM to perform first data update based on the first dirty data;

acquire a second dirty data generated by running of the program on the PM in a process of the first data update;

transmit the second dirty data to the VM to enable the VM to perform second data update based on the second dirty data; and repeat the above process till an Nth dirty data is acquired, stop the program to run, and transmit the Nth dirty data to the VM, such that the VM performs Nth dirty data update based on the Nth dirty data.

A data size of the Nth dirty data is smaller than a preset data threshold.

In an embodiment, the update module 73 is further configured to transmit a request for stopping the running of the program to the VM, to acquire a response returned by the VM in response to the request.

In an embodiment, the update module 73 is further configured to create a first temporary file;

write the first dirty data and a first data stored in the VM into the first temporary file to form a second temporary file;

wherein the first data is data except for a file offset corresponding to the first dirty data in a file corresponding to the program; and replace the file corresponding to the program and stored in the VM with the second temporary file.

In an embodiment, the update module 73 is further configured to calculate an overall check code of the second temporary file; and determine that the overall check code of the second temporary file is matched with an overall check code of the file corresponding to the program.

In an embodiment, the apparatus may further include: a filter module 75.

The filter module 75 is configured to compare a type and version information for an operation system of the PM with specified type and version information for an operation system of the VM; and update a drive corresponding to the operation system of the VM in a case where it is determined that the type of the operation system of the PM is the same as the specified type of the operation system of the VM and the version of the operation system of the PM is different from the specified version of the VM.

In an embodiment, the filter module 75 is further configured to compare a difference between a version of a drive corresponding to the operation system of the PM and a specified version of the drive corresponding to the operation system of the VM; and determine that the difference meets a preset drive update condition.

In an embodiment, the filter module 75 is further configured to acquire a difference file between the drive corresponding to the operation system of the PM and the specified drive corresponding to the operation system of the VM; and synchronize the difference file to the VM, to update the drive corresponding to the operation system of the VM based on the difference file.

Figure 8:
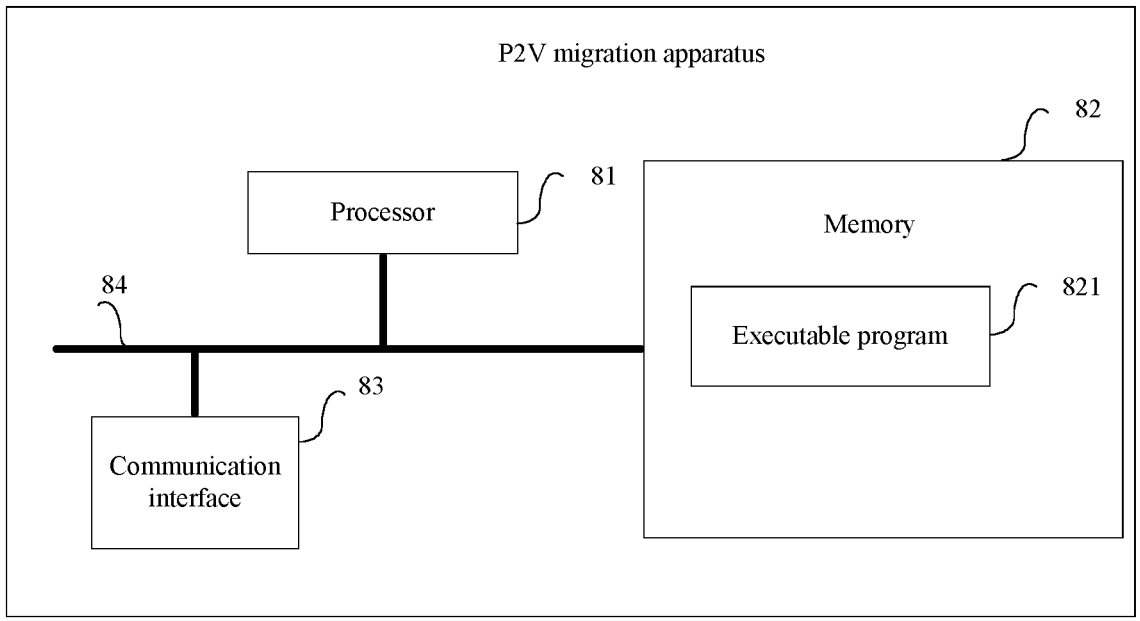
FIG. 8 is a compositional and structural schematic diagram of a P2V migration apparatus provided by an embodiment of the disclosure.

FIG. 8 is a compositional and structural schematic diagram of a P2V migration apparatus provided by an embodiment of the disclosure. As shown in FIG. 8, the P2V migration apparatus provided by the embodiment of the disclosure may include: a processor 81, a memory 82 and at least one external communication interface 83.

The processor 81, the memory 82 and the external communication interface 83 are all connected by a bus 84.

The memory 82 is configured to store an executable program 821.

The processor 81 is configured to run the executable program stored in the memory to implement the following operations.

Disk data of a PM is transmitted to a server, wherein the disk data is used by the server to create and start a VM based on the disk data of the PM; a first dirty data generated by running of a program on the PM in a transmission process of the disk data of the PM is acquired; the disk data for creating the VM is updated iteratively based on the acquired first dirty data; and based on the updated disk data for the VM, the VM is controlled to resume running the program based on a progress of the program, i.e., the VM is controlled to take over the program run by the PM.

Correspondingly, the embodiments of the disclosure further provide a readable storage medium, which stores an executable program.

The executable program is configured to be executed by a processor to implement the following operations.

Disk data of a PM is transmitted to a virtualization management platform, to create and start a VM based on the disk data of the PM; a first dirty data generated by running of a program on the PM in a transmission process of the disk data of the PM is acquired; the disk data for creating the VM is updated iteratively based on the acquired first dirty data; and based on the updated disk data for the VM, the VM is controlled to take over the program run by the PM.

It is to be noted that the description on the above P2V migration apparatus is similar to that of the above method, so the beneficial effects are the same to the method and will not be repeated herein. A technical detail not disclosed in the P2V migration apparatus of the disclosure may be understood with reference to the description on the method embodiments of the disclosure.

Those of ordinary skill in the art should know that: all or part of the operations of the above-mentioned method embodiment may be implemented by instructing related hardware through a program, the above-mentioned program may be stored in a computer-readable storage medium, and the program is executed to execute the operations of the above-mentioned method embodiment; and the storage medium includes: various media capable of storing program codes such as mobile storage equipment, a Read-Only Memory (ROM), a Random Access Memory (RAM), a magnetic disk or an optical disc.

Or, when being implemented in form of software function module and sold or used as an independent product, the integrated unit of the disclosure may also be stored in a computer-readable storage medium. Based on such an understanding, the technical solution of the disclosure substantially or parts making contributions to the relevant art may be embodied in a form of software product, and the computer software product is stored in a storage medium, including multiple instructions configured to enable a computer device (which may be a personal computer, a server, a network device or the like) to execute all or part of the method in each embodiment of the disclosure. The above-mentioned storage medium includes: various media capable of storing program codes such as mobile storage equipment, a ROM, a RAM, a magnetic disk or an optical disc.

The above is only the specific implementation manner of the disclosure and not intended to limit the scope of protection of the disclosure. Any variations or replacements apparent to the person skilled in the art within the technical scope disclosed by the disclosure shall fall within the scope of protection of the disclosure. Therefore, the scope of protection of the disclosure shall be subjected to the scope of protection of the claims.

What is claimed is:

1. A Physical to Virtual (P2V) migration method, comprising:

transmitting disk data of a Physical Machine (PM) to a server, wherein the disk data is used by the server to create and start a Virtual Machine (VM) based on the disk data of the PM;

acquiring a first dirty data generated by running of a program on the PM in a transmission process of the disk data of the PM;

updating, based on the acquired first dirty data, the disk data for creating the VM; and controlling, based on the updated disk data for the VM, the VM to resume running the program based on a progress of the program;

wherein acquiring a first dirty data generated by running of a program on the PM in a transmission process of the disk data of the PM comprises:

monitoring, in the transmission process of the disk data of the PM, a file corresponding to the program running on the PM to form a record file;

transmitting the record file to the VM to obtain a check code generated and returned by the VM based on the record file;

calculating a check code of a local file corresponding to the program;

sequentially reading the calculated check code according to a file offset;

respectively matching the check code read each time with the check code returned by the VM; and determining data failed in matching as the first dirty data generated by running of the program on the PM.

2. The method as claimed in claim 1, wherein updating, based on the acquired first dirty data, the disk data for creating the VM comprises:

transmitting the first dirty data to the VM to enable the VM to perform first data update based on the first dirty data;

acquiring a second dirty data generated by running of the program on the PM in a process of the first data update;

transmitting the second dirty data to the VM to enable the VM to perform second data update based on the second dirty data; and repeating the above process till an Nth dirty data is acquired, the running of the program stops, and the Nth dirty data is transmitted to the VM, such that the VM performs Nth dirty data update based on the Nth dirty data, wherein a data size of the Nth dirty data is smaller than a preset data threshold.

3. The method as claimed in claim 2, after acquiring the Nth dirty data, further comprising:

transmitting a request for stopping the running of the program to the VM, to acquire a response returned by the VM in response to the request.

4. The method as claimed in claim 2, wherein performing, by the VM, the first data update based on the first dirty data comprises:

creating a first temporary file;

writing the first dirty data and a first data stored in the VM into the first temporary file to form a second temporary file, wherein the first data is data except for a file offset corresponding to the first dirty data in a file corresponding to the program; and replacing the file corresponding to the program and stored in the VM with the second temporary file.

5. The method as claimed in claim 4, after forming the second temporary file, further comprising:

calculating an overall check code of the second temporary file; and determining that the overall check code of the second temporary file is matched with an overall check code of the file corresponding to the program.

6. The method as claimed in claim 1, further comprising:

comparing a type and version information for an operation system of the PM with specified type and version information for an operation system of the VM; and updating a drive corresponding to the operation system of the VM in a case where it is determined that the type of the operation system of the PM is the same as the specified type of the operation system of the VM and the version of the operation system of the PM is different from the specified version of the VM.

7. The method as claimed in claim 6, further comprising:

comparing a difference between a version of a drive corresponding to the operation system of the PM and a specified version of the drive corresponding to the operation system of the VM; and determining that the difference meets a preset drive update condition.

8. The method as claimed in claim 6, wherein updating the drive corresponding to the operation system of the VM comprises:

acquiring a difference file between the drive corresponding to the operation system of the PM and the specified drive corresponding to the operation system of the VM; and synchronizing the difference file to the VM, to update the drive corresponding to the operation system of the VM based on the difference file.

9. The method as claimed in claim 1, wherein the check code comprises a strong check code and a weak check code; and correspondingly, respectively matching the check code read each time with the check code returned by the VM comprises:

performing first matching on a read first weak check code and a second weak check code returned by the VM;

when the first matching fails, determining that the matching fails;

when the first matching succeeds, performing second matching on a first strong check code corresponding to the first weak check code and a second strong check code corresponding to the second weak check code; and when the second matching fails, determining that the matching fails.

10. The method as claimed in claim 1, wherein generating, by the VM, the check code based on the record file comprises:

reading data in the record file;

segmenting the read data into data blocks according to a fixed byte length; and generating the corresponding check code for each data block segment.

11. A Physical to Virtual (P2V) migration apparatus, comprising:

a memory, configured to store an executable program; and a processor, configured to execute the executable program stored in the memory to implement the P2V migration method as claimed in claim 1.

12. A storage medium, storing an executable program, wherein the executable program is executed by a processor to implement the Physical to Virtual (P2V) migration method as claimed in claim 1.

13. A Physical to Virtual (P2V) migration apparatus, comprising:

a processing module, configured to transmit disk data of a Physical Machine (PM) to a server, wherein the disk data is used by the server to create and start a Virtual Machine (VM) based on the disk data of the PM;

an acquisition module, configured to acquire a first dirty data generated by running of a program on the PM in a transmission process of the disk data of the PM;

an update module, configured to update, based on the acquired first dirty data, the disk data for creating the VM; and a control module, configured to control, based on the updated disk data for the VM, the VM to take over the program run by the PM;

wherein the acquisition module is further configured to:

monitor a file corresponding to the program running on the PM in the transmission process of the disk data of the PM to form a record file;

transmit the record file to the VM to obtain a check code generated and returned by the VM based on the record file;

calculate a check code of a local file corresponding to the program;

sequentially read the calculated check code according to a file offset;

respectively match the check code read each time with the check code returned by the VM; and determine data failed in matching as the first dirty data generated by running of the program on the PM.

14. The apparatus as claimed in claim 13, wherein the update module is further configured to transmit the first dirty data to the VM to enable the VM to perform first data update based on the first dirty data;

acquire a second dirty data generated by running of the program on the PM in a process of the first data update;

transmit the second dirty data to the VM to enable the VM to perform second data update based on the second dirty data; and repeat the above process till an Nth dirty data is acquired, stop the program to run, and transmit the Nth dirty data to the VM, such that the VM performs Nth dirty data update based on the Nth dirty data, wherein a data size of the Nth dirty data is smaller than a preset data threshold.

15. The apparatus as claimed in claim 13, further comprising a filter module configured to:

compare a type and version information for an operation system of the PM with specified type and version information for an operation system of the VM; and update a drive corresponding to the operation system of the VM in a case where it is determined that the type of the operation system of the PM is the same as the specified type of the operation system of the VM and the version of the operation system of the PM is different from the specified version of the VM.

* * * * *